United States Patent
D'Angelo

(10) Patent No.: US 7,827,835 B2
(45) Date of Patent: Nov. 9, 2010

(54) UNIVERSAL STEERING WHEEL LOCK

(75) Inventor: Eduardo D'Angelo, Miami, FL (US)

(73) Assignee: Eduardo F. D'Angelo, Miami, FL (US)

( * ) Notice: Subject to any disclaimer, the term of this patent is extended or adjusted under 35 U.S.C. 154(b) by 5 days.

(21) Appl. No.: 12/456,640

(22) Filed: Jun. 20, 2009

(65) Prior Publication Data

US 2009/0282878 A1 Nov. 19, 2009

Related U.S. Application Data

(63) Continuation-in-part of application No. 12/221,347, filed on Aug. 2, 2008, now abandoned.

(60) Provisional application No. 60/965,976, filed on Aug. 23, 2007, provisional application No. 61/011,609, filed on Jan. 18, 2008, provisional application No. 61/134,801, filed on Jul. 14, 2008.

(51) Int. Cl.
B60R 25/02 (2006.01)
(52) U.S. Cl. .......................... 70/209; 70/226
(58) Field of Classification Search .................. 70/19, 70/209, 211, 212, 225, 226, 237, 238, 432; 340/426.31
See application file for complete search history.

(56) References Cited

U.S. PATENT DOCUMENTS

| | | | | | |
|---|---|---|---|---|---|
| 1,193,679 | A | * | 8/1916 | Fox | 70/199 |
| 3,245,239 | A | * | 4/1966 | Kitty | 70/202 |
| 3,550,409 | A | * | 12/1970 | Pariser | 70/203 |
| 3,690,131 | A | * | 9/1972 | Gordon et al. | 70/203 |
| 4,493,198 | A | * | 1/1985 | Brown | 70/203 |
| 4,699,238 | A | * | 10/1987 | Tamir | 180/287 |
| 4,738,127 | A | * | 4/1988 | Johnson | 70/209 |
| 4,856,308 | A | * | 8/1989 | Johnson | 70/209 |
| 4,934,492 | A | * | 6/1990 | Hayes-Sheen | 188/353 |
| 5,007,259 | A | * | 4/1991 | Mellard | 70/209 |
| 5,040,387 | A | * | 8/1991 | Knott, Jr. | 70/202 |
| 5,255,544 | A | * | 10/1993 | Wu | 70/209 |
| 5,267,458 | A | * | 12/1993 | Heh | 70/238 |
| 5,299,438 | A | * | 4/1994 | Chen | 70/209 |
| 5,345,796 | A | * | 9/1994 | Chieh et al. | 70/202 |
| 5,375,441 | A | * | 12/1994 | Liou | 70/209 |
| 5,555,753 | A | * | 9/1996 | Matlock | 70/209 |
| 5,598,725 | A | * | 2/1997 | Chang | 70/209 |
| 5,653,133 | A | * | 8/1997 | Passantino | 70/238 |
| 5,671,620 | A | * | 9/1997 | Carvey et al. | 70/238 |
| 5,678,434 | A | * | 10/1997 | Kuo et al. | 70/209 |
| 5,870,912 | A | * | 2/1999 | Vito | 70/202 |
| 6,378,343 | B1 | * | 4/2002 | Lee | 70/209 |
| 6,513,355 | B1 | * | 2/2003 | Lin | 70/209 |
| 6,668,604 | B1 | * | 12/2003 | Hsieh | 70/209 |

(Continued)

*Primary Examiner*—Lloyd A Gall
(74) *Attorney, Agent, or Firm*—Laurence J. Edson, Esq.

(57) ABSTRACT

A steering wheel lock having a triple hook, a bar receiving mechanism, a lock box, a bar fixable to the lock box, and a lock is disclosed. The triple hook, via its lock box attaches to the steering wheel of a vehicle and is secured with the lock, which is attached with the bar. The length of the bar is adjusted within the lock box to provide a tight and secure fit customized to the particular dimensions of the steering wheel. A blinking LED alerts a passerby that the lock is engaged. A second embodiment covers the center of the steering wheel to prevent airbag theft and secure opposite sides of the steering wheel.

11 Claims, 14 Drawing Sheets

U.S. PATENT DOCUMENTS

| | | | |
|---|---|---|---|
| 6,708,536 B1 * | 3/2004 | Yu | 70/199 |
| 6,766,674 B2 * | 7/2004 | Simon | 70/202 |
| 6,901,781 B1 * | 6/2005 | Lin | 70/209 |
| 7,576,638 B2 * | 8/2009 | Yu | 340/426.31 |

* cited by examiner

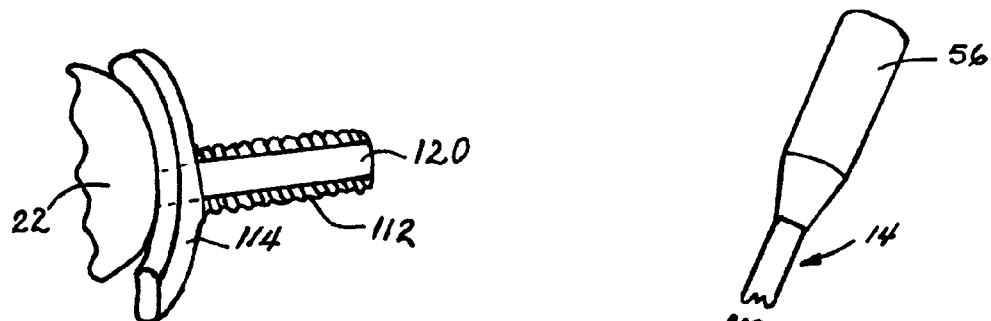
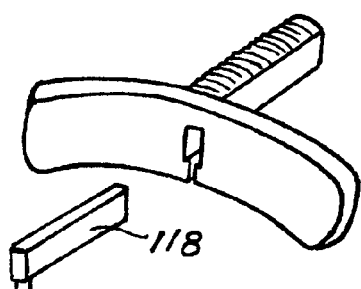
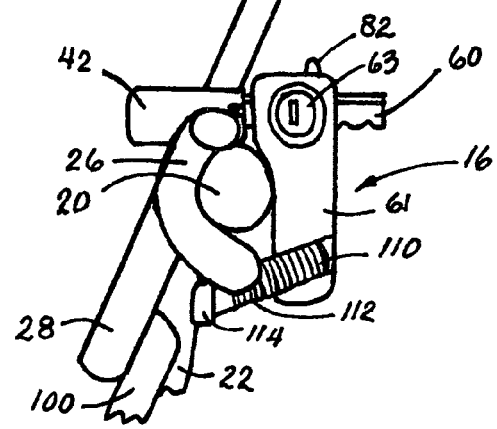
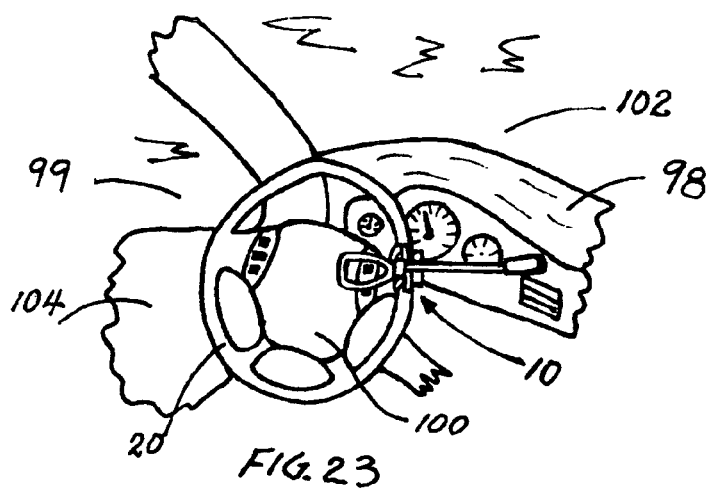

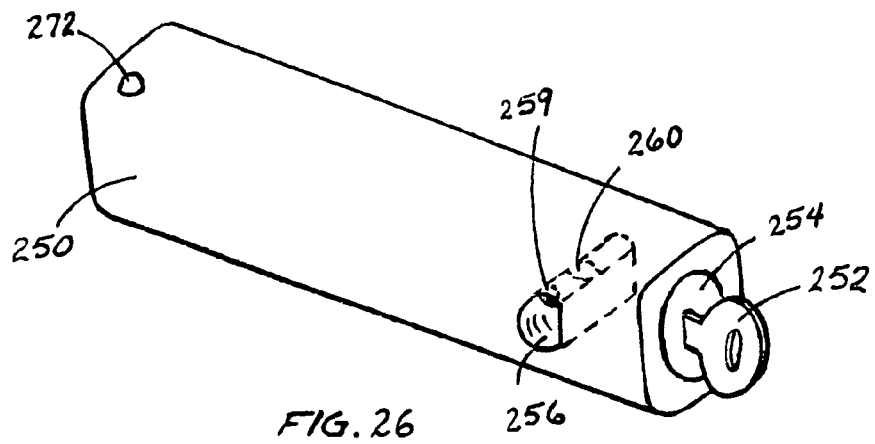
FIG. 26
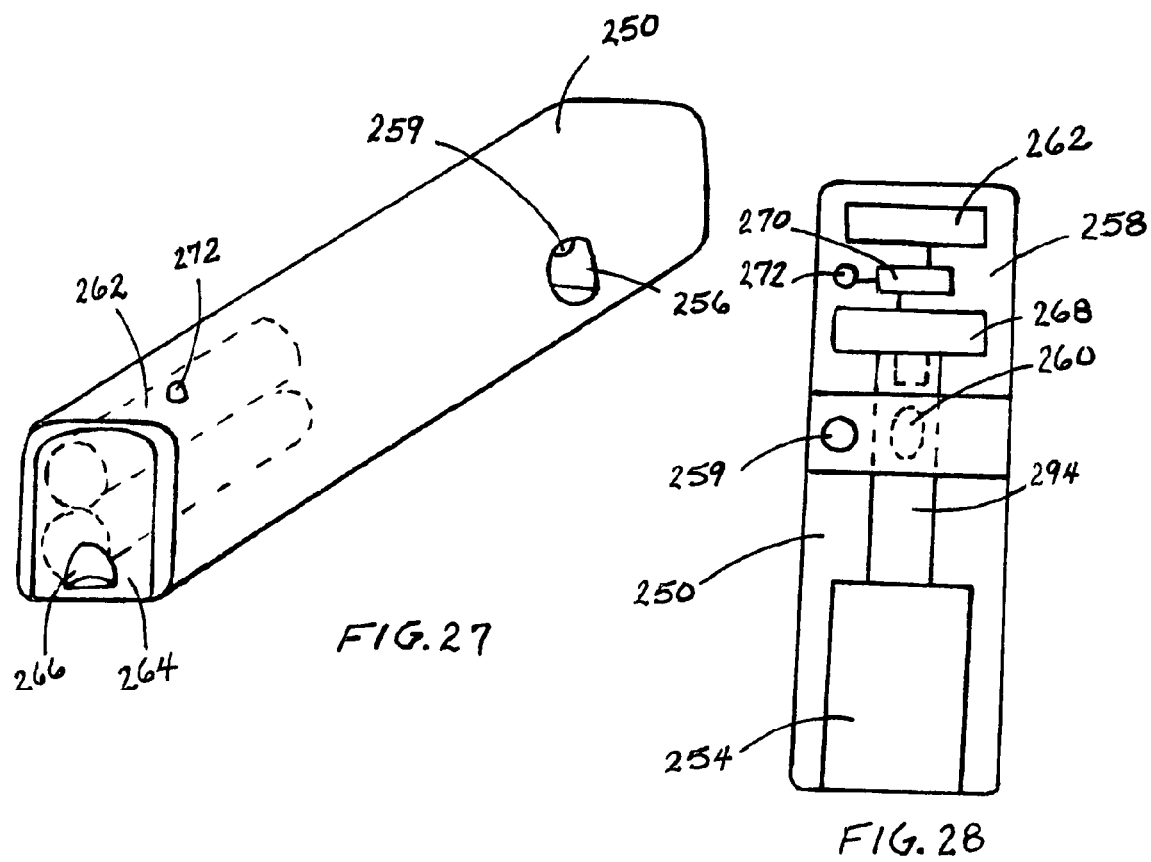
FIG. 27
FIG. 28

UNIVERSAL STEERING WHEEL LOCK

This application is a continuation-in-part of U.S. Non-Provisional application Ser. No. 12/221,347 filed Aug. 2, 2008 now abandoned to Eduardo D'Angelo. This application further claims priority of U.S. Provisional application number 60/965,976 filed Aug. 23, 2007 to Eduardo D'Angelo for Universal Steering Wheel Lock, U.S. Provisional application No. 61/011,609 filed Jan. 18, 2008 to Eduardo D'Angelo for Universal Steering Wheel Lock, U.S. Provisional application No. 61/134,801 filed Jul. 14, 2008 to Eduardo D'Angelo for Universal Steering Wheel Lock, and U.S. Provisional application No. 61/201,049 filed Dec. 6, 2008 to Eduardo D'Angelo for Universal Steering Wheel Lock.

BACKGROUND OF THE INVENTION

1. Introduction

Cars are expensive, but certain factors limit their appeal to thieves. For example, a big lock on the steering wheel makes stealing difficult requiring significant time and effort. Also, a thief can see the big lock, and move to another less challenging car to steal. Finally, motors might be somewhat distinctive, bearing serial numbers or other indicia. Consequently, thieves have found a more favorable risk to reward ratio in just stealing the parts of the motor.

Most car steering wheels have three sections: a horn at the center of the wheel, a circular wheel section, where a driver grips and steers the car, and at least one arm joining the center to the circular wheel section.

If the steering wheel can be fixed in place, and its unauthorized movement restricted, then the car cannot be removed.

2. Field of the Invention

The present invention relates to a lock for securing the steering wheel of a motor vehicle to prevent the movement of the wheel, thereby preventing unauthorized operation of the vehicle.

3. Description of the Prior Art

Motor vehicle security devices are disclosed in U.S. Patents. U.S. Pat. No. 5,653,133, to Passantino teaches a steering wheel and brake-locking device for road vehicles. Passantino's lock is installed between the brake and the steering wheel.

U.S. Pat. No. 5,555,753 to Matlock teaches a vehicular anti-theft steering wheel lock. Matlock's lock primarily surrounds and immobilizes vehicle steering wheels with a rigid circular pan that surmounts the steering wheel and overlies the steering column.

U.S. Pat. No. 5,267,458 to Heh teaches a lock that hooks on to a steering wheel, and the vehicles brake. Here again, the brake serves as an anchor preventing the movement of the steering wheel via a rigid member.

U.S. Pat. No. 4,738,127 to Johnson is a patent directed toward an automobile steering lock.

BRIEF SUMMARY OF THE INVENTION

It is an object of the present invention to prevent the unauthorized operation of a motor vehicle.

Another object of the present invention is to provide a lock that will prevent the movement of the steering wheel of a vehicle.

A further object of the present invention is to provide a lock that can draw attention by continuously flashing an LED.

A further object of the present invention is to provide a lock that will sound the vehicles horn if one attempts to remove the lock without a key.

A further objective is to provide a lock that allows one-time fine adjustment to provide a customized, tight fit for a unique steering wheel.

Yet another objective is to provide a lock that prevents the theft of airbags from the driver's steering column.

These and other objects of the invention are accomplished by providing a steering wheel lock having a triple hook, a bar, and a lock. The triple hook abuts the steering wheel, and the bar fixes the lock to the triple hook and the steering wheel.

Other objects and further scope of applicability of the present invention will become apparent from the detailed description given hereinafter. However, it should be understood, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE SEVERAL VIEWS OF THE DRAWING

The present invention will be better understood from the detailed description given herein below and the accompanying drawings with which are given by way of illustration only.

FIG. 20 is a view of an adjustment screw with a truncated area of the presently claimed invention.

FIG. 21 is a view of an adjustment screw with a rectangular bar of the presently claimed invention.

FIG. 22 is a view of the second embodiment of the presently claimed invention from the side.

FIG. 23 is an environmental view of the second embodiment of the presently claimed invention.

FIG. 26 is a perspective view of the square metal bar structure, showing the key and the lock mechanism, of the third embodiment of the present invention.

FIG. 27 is a perspective view of the square metal bar structure, showing the battery cavity. of the third embodiment of the present invention.

FIG. 28 is a cross-sectional view of the square metal bar structure of the third embodiment of the present invention

DETAILED DESCRIPTION OF THE INVENTION

Figure 1A:
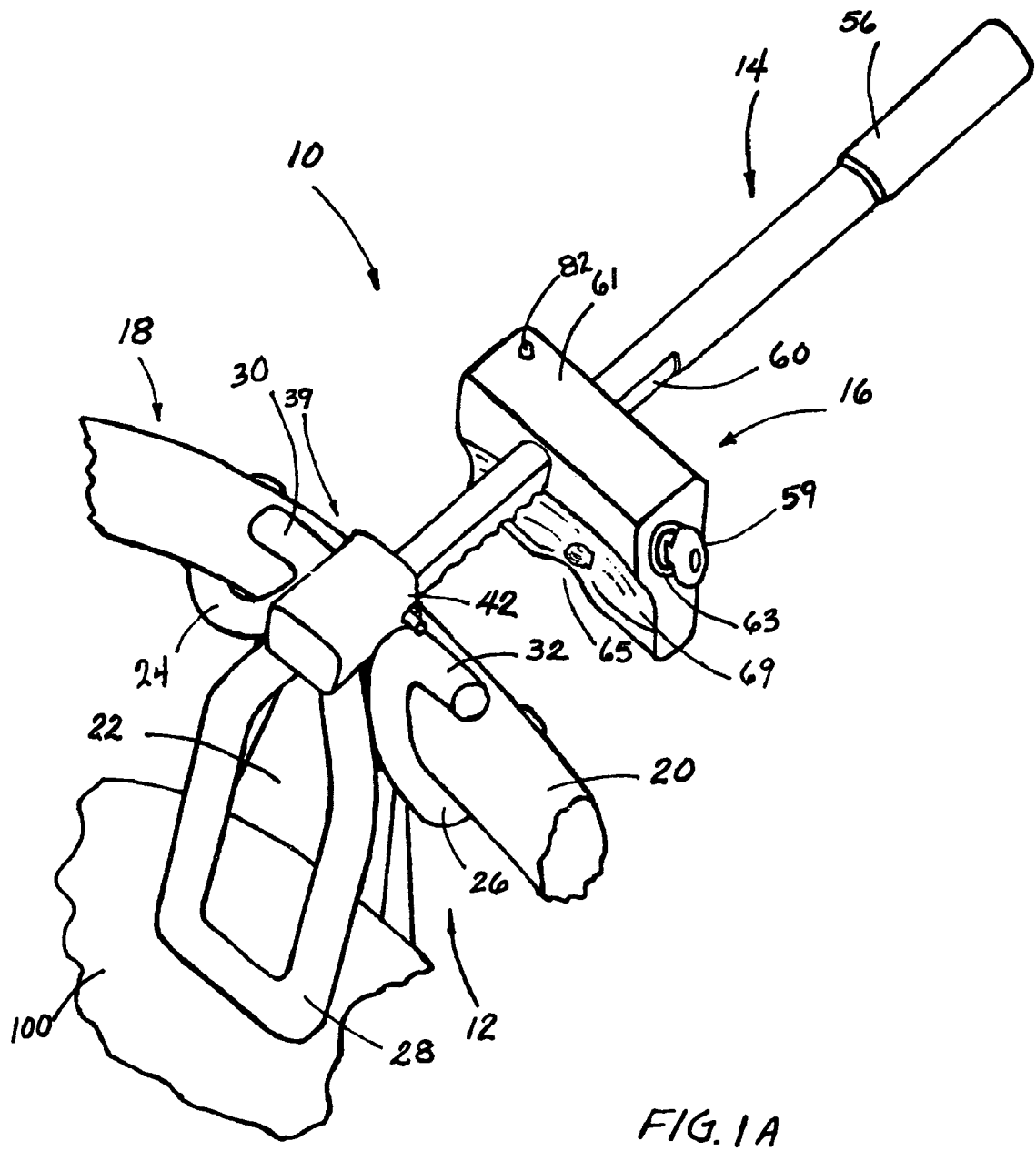
FIG. 1A is a perspective view of the lock of the present invention.
Figure 1B:
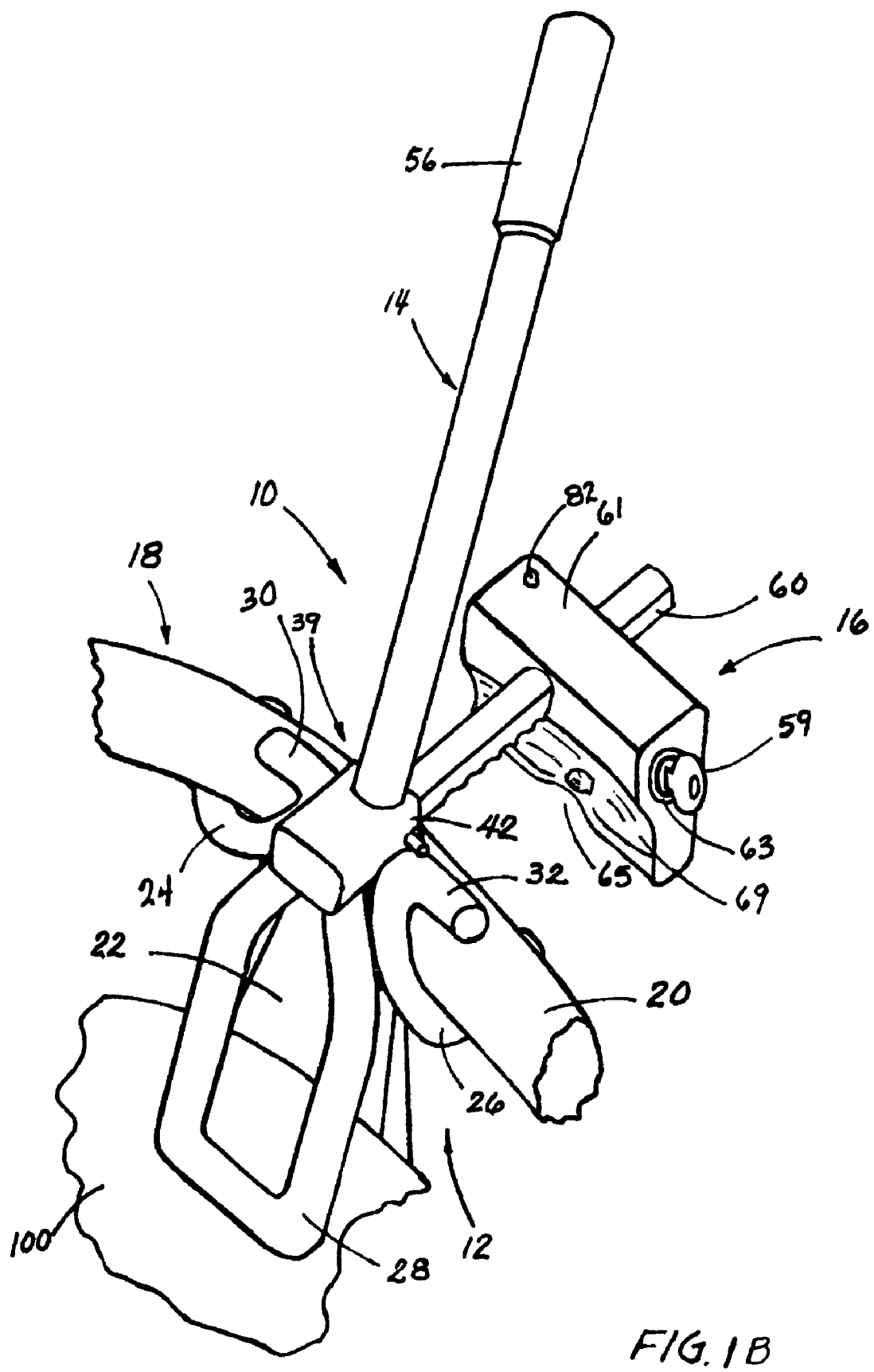
FIG. 1B is a perspective view of an alternative embodiment of the lock of the present invention.

A Universal Steering Wheel Lock of the presently claimed invention is illustrated in FIG. 1A and designated generally by reference numeral 10. With reference now to the drawings and in particular to FIG. 1A, the steering wheel lock has three basic components: a triple hook 12, a bar 14 and a lock 16. FIG. 1B shows an alternative embodiment of the invention in which the truncated area of the bar remains in contact with the lock and the lock box, but the remaining portion of the bar attaches to the lock box and is aligned with the bended bar 28 of the triple hook, as explained below.

The Universal Steering Wheel Lock locks the steering wheel 18 of a vehicle. A conventional steering wheel 18 is formed by the circular wheel section 20 and at least one arm 22 attached at the end to the circular wheel section 20 and to the center of the steering wheel at the other end.

The triple hook 12 has first and second U-shape hooks 24, 26 and a bended bar 28. The U-shaped hooks 24, 26 wrap around the wheel section of the steering wheel 20. The bended bar 28 attaches between the first and second U-shaped hooks 24, 26, and abuts the horn 100.

The shape of the bended bar 28 is shown in FIGS. 1A and 1B. The U-shaped hooks 24, 26 respectively have first and second ends 30, 32. This shape allows hooking up the circular wheel section 20 with the first and second ends 30, 32 and the U-shaped hooks 24, 26. The bended bar 28 assures a tight fit with the arm 22. The first and second ends 30, 32 belong to first and second U-shaped hooks 24, 26 and follow the arc shape of the circular wheel section 20.

Figure 2:
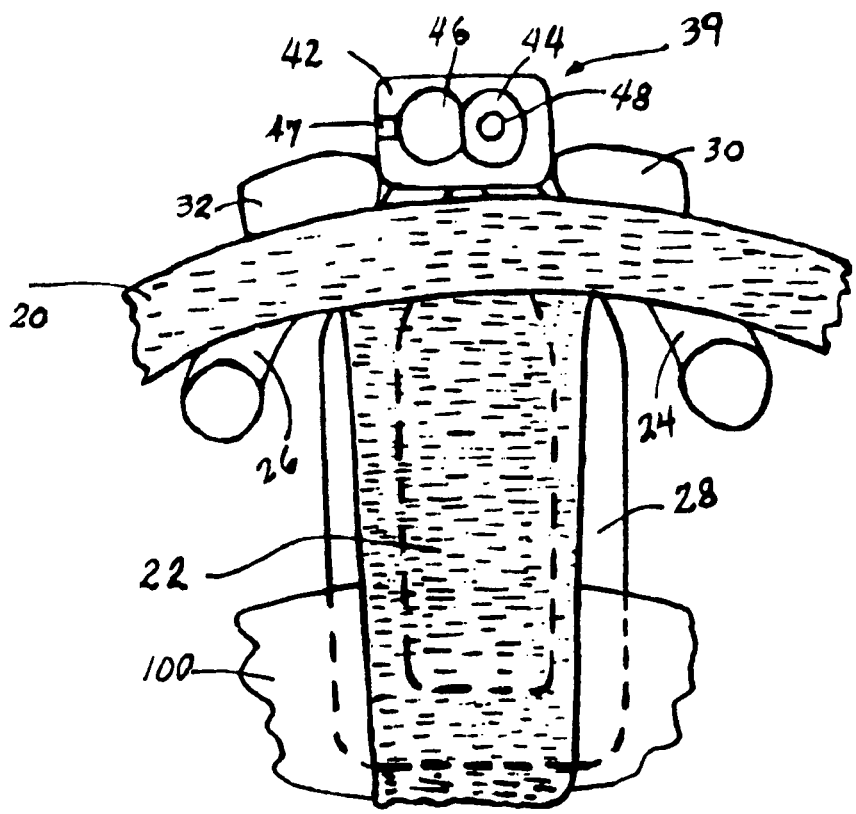
FIG. 2 is a view from the vehicle window showing the triple hook and lock box of the present invention attached to a steering wheel.
Figure 3:
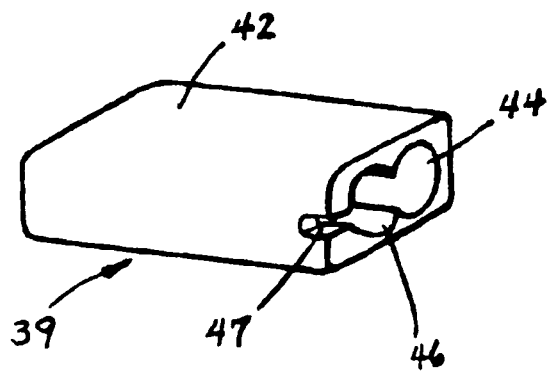
FIG. 3 is a perspective view of the lock box of the present invention.
Figure 15:
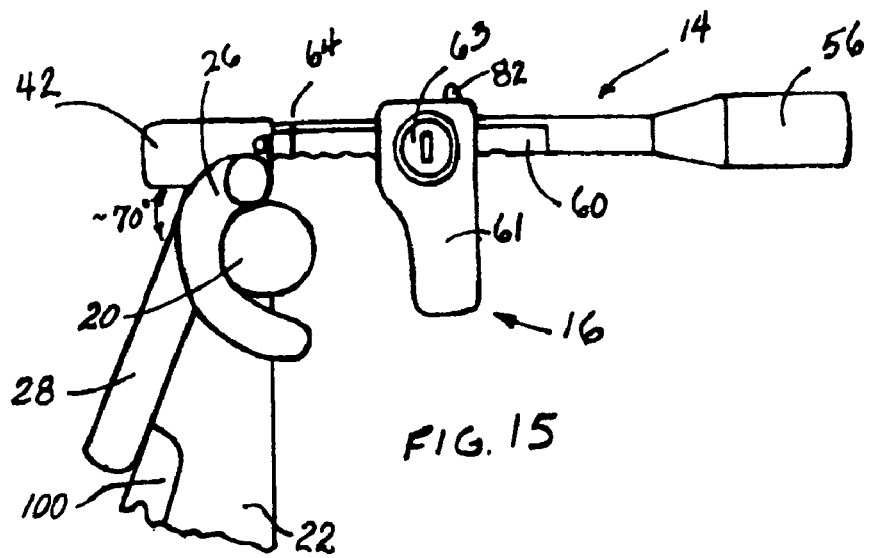
FIG. 15 is a view of the presently claimed invention attached, and unlocked.

The triple hook 12 includes a bar receiving mechanism 39 as illustrated in FIGS. 1, 2 and 3. The bar receiving mechanism 39 features a lock box 42 attached to first and second ends 30, 32 of first and second U-shaped hooks 24, 26 and to the bended bar 28. As illustrated in FIG. 15, the bar receiving mechanism 39 is positioned approximately 70 degrees in reference with the side of the bended bar 28 directly opposite the steering wheel 18 to compensate the inclination of the steering wheel 18 in a vehicle.

Figure 4:
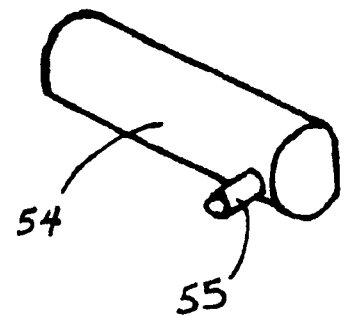
FIG. 4 is a view of the stopper and stopper knob of presently claimed invention.
Figure 7:
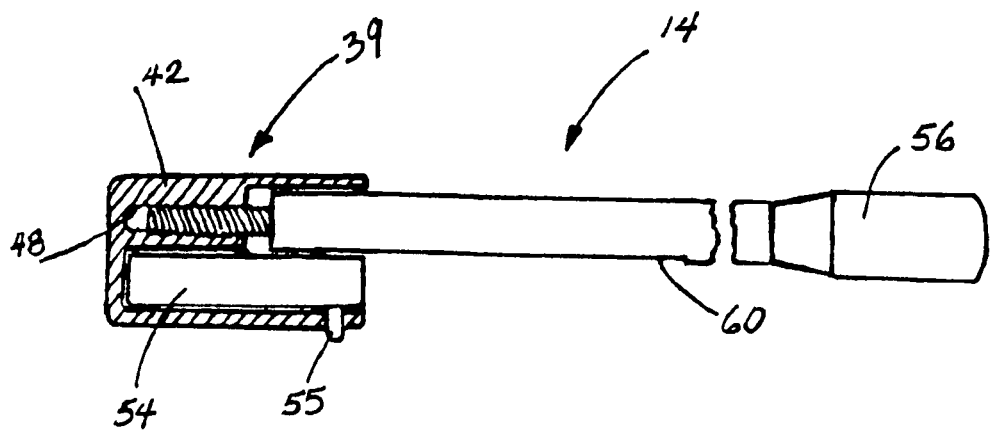
FIG. 7 is a cross-sectional view of a lock box with the stopper and bar inserted for the presently claimed invention.

The lock box 42 has a bar cavity 44, a stopper cavity 46 and a stopper knob cavity 47 as illustrated in FIGS. 2 and 3. As seen in FIG. 7. the bar cavity 44 has an internal threaded orifice 48 abutting the bar cavity along its longitudinal axis. FIG. 4 shows a stopper 54 having a stopper knob 55 perpendicular at one end of the stopper 54. The stopper 54 and stopper knob 55 having, such size and dimension to substantially fill the stopper cavity 46 and a stopper knob cavity 47.

The triple hook 12 is normally made of metal mainly hardened steel covered with a rubber finish to avoid any damage to the steering wheel 18.

Figure 5:
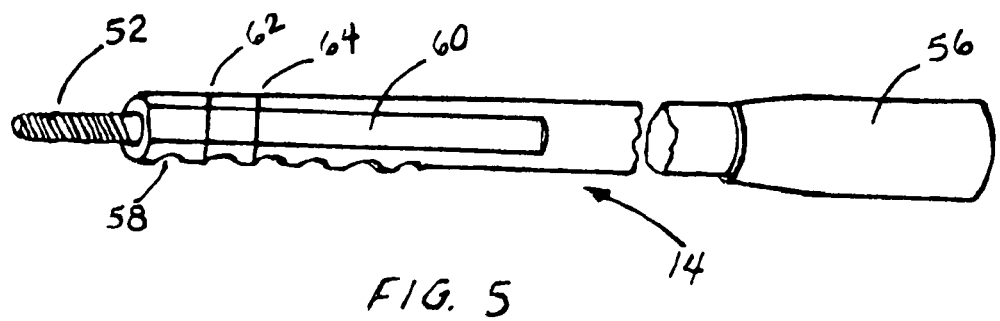
FIG. 5 is a view of a bar for the presently claimed invention.

There is a bar 14 as illustrated in FIG. 1 and FIG. 5. The bar 14 has at one end a screw shape 52 with a thread to be screw up in the bar cavity 44 gradually until the desire position, as illustrated in FIG. 7.

The stopper 54 is inserted in the stopper cavity 46 to prevent the rotational moving of bar 14 inserted in the bar cavity 44 when has reached the desire position. This function will be described in detail later.

The stopper 54 has a small knob 55 as illustrated in FIG. 4 to allow manual removal of the stopper 54 from the stopper cavity 46. This knob 55 is inserted in the stopper knob cavity 47 when the bar 14 is locked in the desire position as illustrated in FIGS. 6 and 7.

Figure 17:
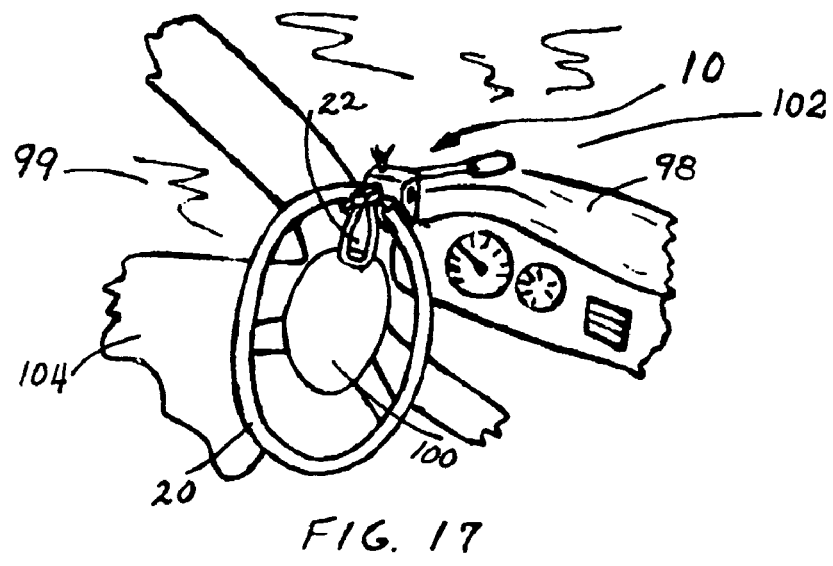
FIG. 17 is a perspective view. of the presently claimed invention installed on a steering wheel.

The bar 14 is illustrated in detail in FIG. 5. The end of bar 14 has a screw shape 52 already described. The other end of bar 14 has a rubber grip 56 to cover the bar 14 avoiding any damages in the dashboard 98 and front window 102 of the vehicle, as illustrated in FIG. 17.

Figure 6:
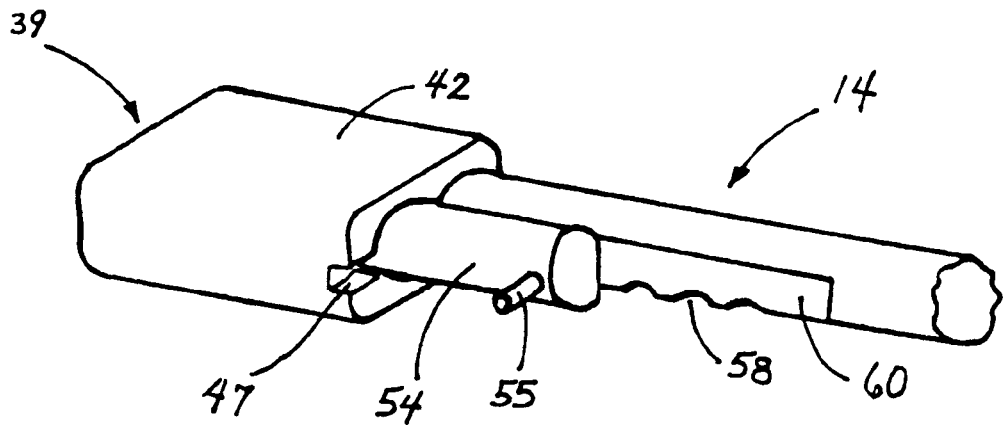
FIG. 6 is a view of a lock box, stopper and a portion of the bar for the presently claimed invention.
Figure 13:
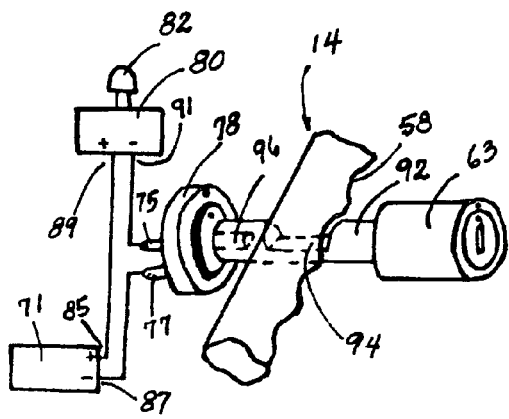
FIG. 13 is a view of an unlocked lock for the presently claimed invention illustrating the wiring schematic for an LED warning system.
Figure 14:
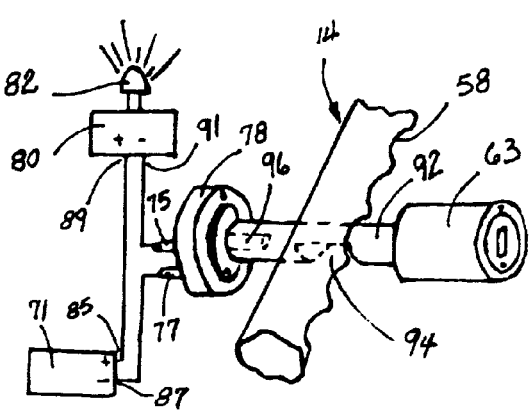
FIG. 14 is a view of a locked lock for the presently claimed invention illustrating the wiring schematic for an LED warning system.

FIGS. 5 and 6 show the bar 14 has at the bottom different teeth creating a sequence of shallow ridges 58 used in the locking mechanism of FIGS. 13 and 14. The bar 14 has a truncated area 60 in the left side of the bar 14 located in the sequence of shallow ridges 58 as illustrated in FIG. 5. The bar 14 has first and second marks 62, 64. Both of them will be explained later.

Figure 8:
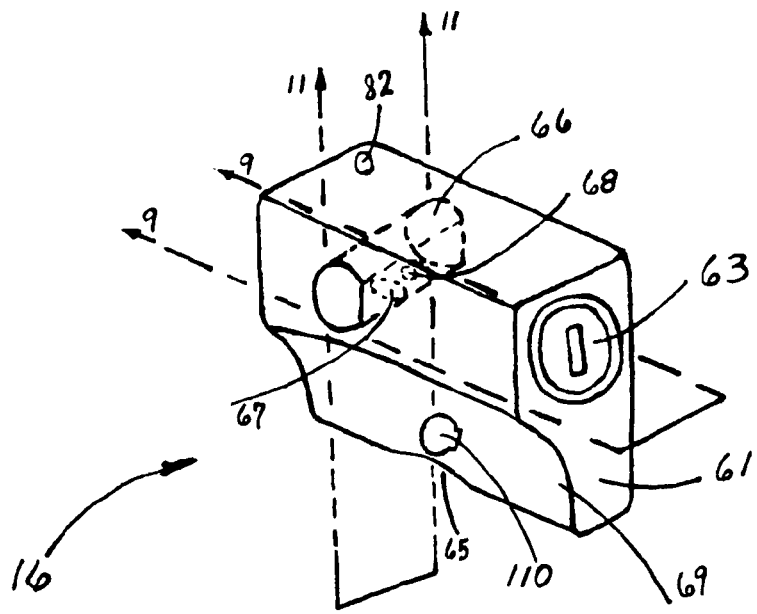
FIG. 8 is a view of a lock for the presently claimed invention showing internal cavities.
Figure 9:
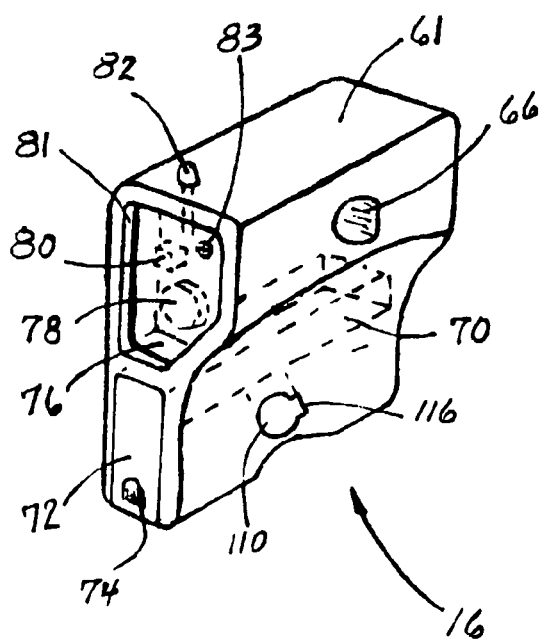
FIG. 9 is another view of a lock for the presently claimed invention showing additional cavities.
Figure 10:
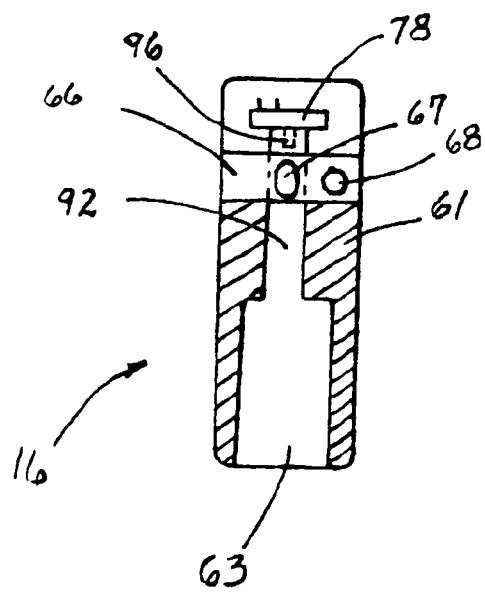
FIG. 10 is a cross-sectional view of a lock for the presently claimed invention showing a key lock mechanism.

The lock 16 is illustrated in FIGS. 8, 9 and 10. The lock 16 features a lock housing 61 having a key lock mechanism 63, a truncated hole 66, a case 70 and an indicator recess 76 as illustrated in FIG. 9. The truncated hole 66 has a spherical bearing 68 and an opening 67 as illustrated in FIG. 8 and FIG. 10. The truncated hole 66 allows to pass the bar 14.

The lock 16 has a curved impression 69 to accommodate the circular wheel section 20 of the steering wheel and a dimple 65 to accommodate the arm 22.

The case 70 is designed to hold the batteries 71. The case 70 has a lid 72 able to slide when it is moved using the groove 74, allowing removing the batteries 71 from the case 70 as illustrated in FIG. 9.

The indicator recess 76 comprises a rotary switch 78, a switch circuit 80 and a LED 82. The indicator recess 76 has a lid 81 and a screw 83 to close the indicator recess 76.

Figure 11:
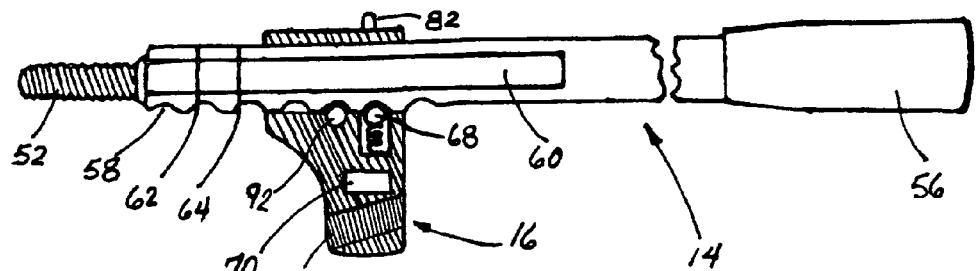
FIG. 11 is a cross-sectional view of a lock with a bar inserted for the presently claimed invention.
Figure 12:
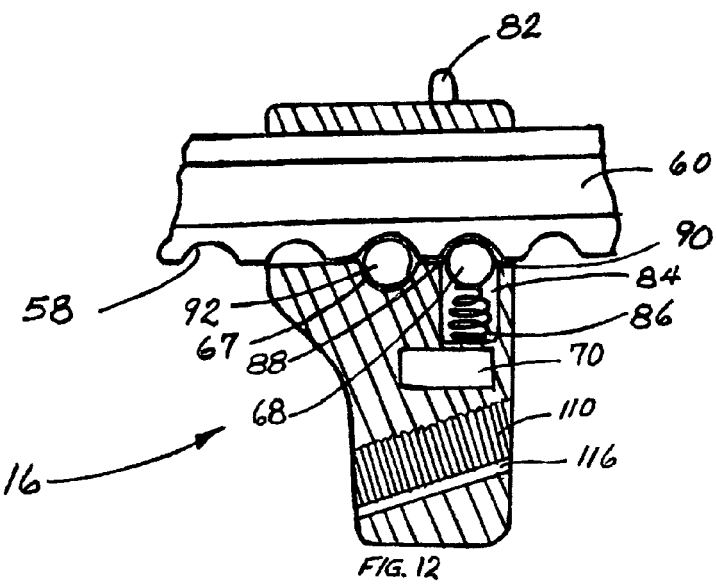
FIG. 12 is a close-up, cross-sectional view of a lock for the presently claimed invention showing the interaction between the lock and a bar.

The interaction between the bar 14 and the lock 16 is illustrated in FIGS. 11 and 12. The bar 14 is inserted in the lock 16 through the truncated hole 66.

The lock 16 has a spring cavity 84. The spring cavity 84 accommodates a spring 86 and a spherical bearing 68. The spring cavity 84 has a set of flanges 88, 90 to avoid the exit of the spherical bearing 68 from the spring cavity 84.

The key lock mechanism 63 has a prolongation bar 92 as illustrated in FIGS. 13 and 14. The prolongation bar 92 comprises a prolongation bar recess 94. The opening 67 allows to interact the prolongation bar 92 belong to the lock mechanism 63 with the sequence of shallow ridges 58 of the bar 14. The prolongation bar recess 94 allows the bar 14 to slide through the truncated hole 66 when the prolongation bar recess 94 is in the position illustrated in FIG. 13. In this illustration the bar 14 is unlocked.

The prolongation bar 92 has a rotary switch cavity 96 at the end with a half moon shape to insert the half moon bar belongs to the rotary switch 78.

The rotary switch 78 has first and second switch contacts 75, 77 as illustrated in FIGS. 13 and 14.

The switch contacts 75, 77 will be open in normal position and closed when the rotary switch 78 has rotated 180 degrees clockwise.

The batteries 71 have first and second battery contacts 85, 87. The first contact 85 is always connected to a switch circuit 80 to an input 89. The second contact 87 of the battery 71 is connected to the second switch contact 77 of the rotary switch 78. The first switch contact 75 of the rotary switch 78 is connected to the second input 91 of the switch circuit 80.

When the bar 14 is unlocked, the switch contacts 75, 77 of the rotary 78 switch are opened. In this situation no current flows from the batteries to the switch circuit 80 and the LED 82 is off as illustrated in FIG. 13.

When the key 59 of the lock mechanism 63 is turned 180 degrees the prolongation bar 92 is present in one of the sequence of shallow ridges 58 of bar 14 through the opening 67. The prolongation bar recess 94 is in the opposite of a ridge of the sequence of shallow ridges 58 belong to the bar 14. In this case the prolongation bar 92 of lock mechanism 63 will lock the bar 14. At the same time when the key has been turned 180 degrees clockwise the rotary switch 78 has rotated 180 degrees too, closing the first and second switch contacts 75, 77 allowing to flux the current from the batteries 71 to the switch circuit 80 and the LED 82 starting to flash as illustrated ill FIG. 14.

The prolongation bar 92 of the lock mechanism 63 is located in the lock 16 a distance from the spherical bearing 68 exactly the distance between the sequence of shallow ridges 58 of the bar 14 as illustrated in FIG. 12. The function of the spherical bearing 68 is to stop the bar 14 in the right position allowing to rotate the key 59 of the lock mechanism 63.

The Universal Steering Wheel Lock has two adjustments to lock the steering wheel of a vehicle. The locking mechanism 39 operates as a fine adjustment and the lock 16 operates as a gross adjustment and final lock.

The adjustment for locking the steering wheel using the lock 16 and the bar 14 goes from one ridge of the sequence of shallow ridges 58 to an adjacent ridge of the sequence of shallow ridges 58 in the bar 14 as illustrated in FIG. 12.

The other locking mechanism 39 illustrated in FIG. 6 and FIG. 7 adjusts the Universal Steering Wheel lock with more precision because every time the bar 14 screwing up a whole turn one thread of the screw shape 52 will advance inside the locking mechanism 39. This advance is at least five (5) times smaller than the steps between the sequence of shallow ridges 58 of the bar 14.

Figure 16:
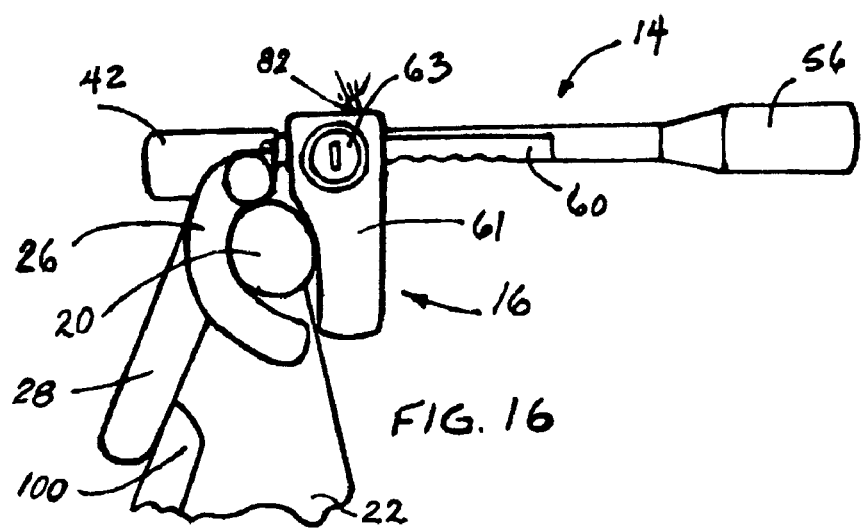
FIG. 16 is a view of the presently claimed invention attached, and locked.

The procedure for the adjustment of the Universal Steering Wheel Lock to the steering wheel of a vehicle is described as follows. The Universal Steering Wheel Lock 10 is inserted in the steering wheel 18 as illustrated in FIGS. 1 and 15. The lock 16 is moved to the steering wheel 18 as illustrated in FIG. 16. If the lock 16 is in position to lock, allowing turning the key 59, but it doesn't adjust firmly the steering wheel 18 then the user starts to screw up the bar 14 between the first and second marks 62, 64 of the bar 14 as illustrated in FIG. 5. The distance the first and second marks 62, 64 matches the distance between the ridges of the sequence of shallow ridges 58.

Once the lock 16 is moved back again to the steering wheel 18 and gets the position able to lock firmly against the steering wheel 18 then the lock 16 is moving back momentarily allowing one to insert the stopper 54 in the stopper cavity 46 locking the bar 14.

The final lock is reached when moving back the lock 16 against the steering wheel 18 and turning the key 59 180 degrees clockwise. The Universal Steering Lock is locked in the steering wheel 18 of a vehicle.

When is locked the space between the front side of locking mechanism 39 and the lock 16 is smaller than the length of the stopper 54 making unable to remove the stopper 54. This procedure is made only one time to adapt the Universal Steering Wheel to a specific steering wheel of a vehicle. The next time the user wants to lock the steering wheel only will be necessary to move the lock 16 against the steering wheel 18 and turn the key 59 180 degrees clockwise. In this moment the Universal Steering Wheel Lock has locked the steering wheel 18 of a vehicle and the LED 82 starts flashing.

The bar 14 of the Universal Steering Wheel Lock firmly attached to the steering wheel 18 obstructs the rotation of the steering wheel 18 when the bar 14 starts to touch the dashboard 98 of the vehicle, as illustrated in FIG. 17.

The U shape of the bar 28 will be on the top of the horn 100 of the steering wheel provoking a horn sound when someone other than car's owner tries to remove the lock as illustrated in FIGS. 17 and 23. FIG. 17 illustrates the Universal Steering Wheel installed in the steering wheel 18 of a vehicle.

Figure 18:
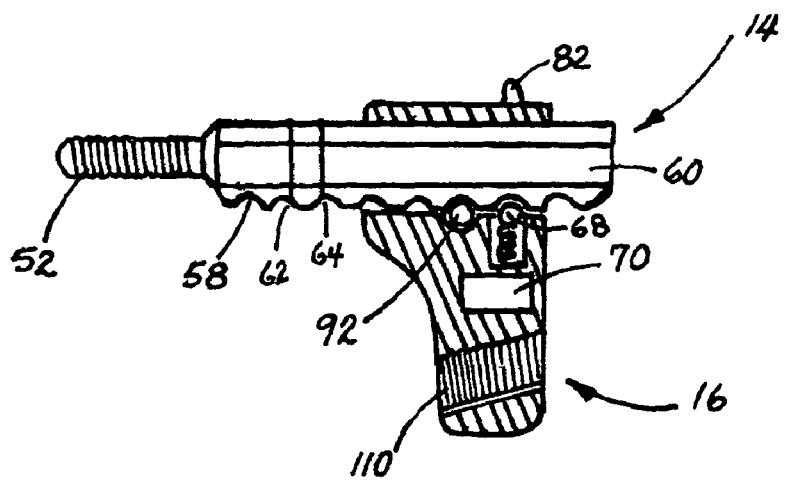
FIG. 18 is a cross-sectional view of the lock for the presently claimed invention.
Figure 19:
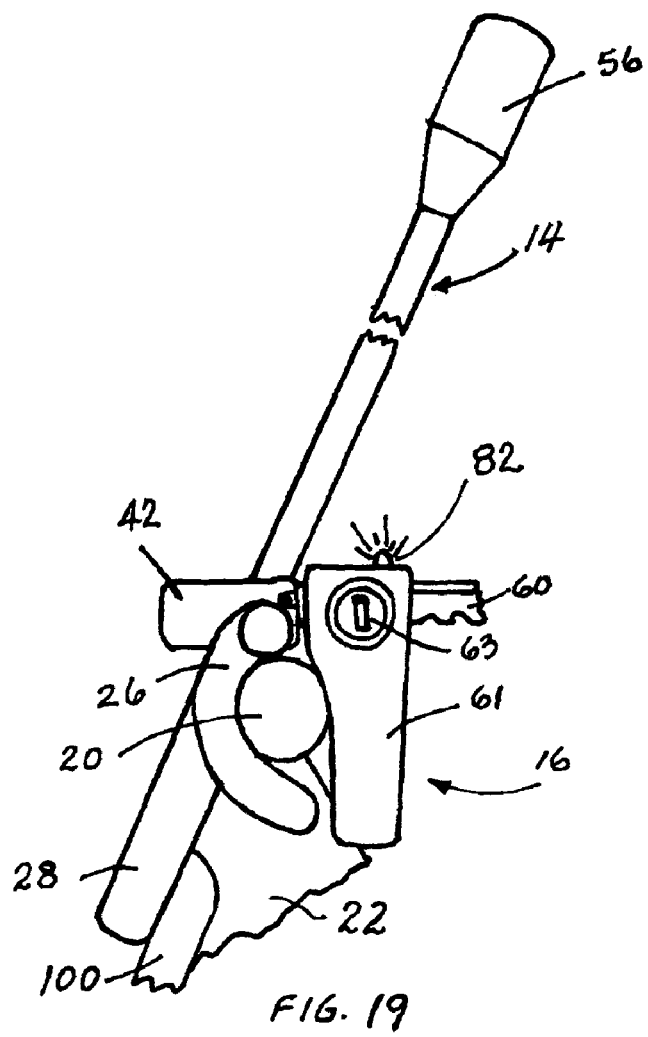
FIG. 19 is a view of a second, alternative embodiment of the presently claimed invention with the bar attached to the lock box and in-line with the triple hook.

A version of the Universal Steering Wheel Lock is shown in the FIGS. 18, 19 and 20. In this embodiment, the bar 14 has been cut keeping only the small section with the truncated area 60 and the sequence of shallow ridges 58 for locking purposes, as illustrated in FIG. 18. The bar 14 is now attached firmly on the top of locking mechanism 39 as illustrated in FIG. 19. The lock 16 is touching the arm 22 avoiding the movement of the Steering Wheel Lock 10.

If the lock 16 does not reach the arm 22 of the steering wheel when is locked, the lock 16 has a threaded adjustment hole 110 and special shape 116 as illustrated in FIGS. 8, 9 and 12.

An adjustment screw 112 with a truncated area 120 is illustrated in FIG. 20. The adjustment screw 112 has a bended T head 114. When the adjustment screw 112 rotates in the threaded adjustment hole 110, the T head 114 will be closer to the arm 22. In this moment the lock 16 is moved back to allow inserting the rectangular bar 118 illustrated in FIG. 21 in the rectangular shape 116 avoiding rotation of the adjustment screw 112 inside the lock 16. This procedure is made only one time to adjust the Universal Steering Wheel Lock to specific arm shape of the steering wheel.

For now on the next time to lock the steering wheel only will be necessary to move the lock 16 against the steering wheel 18 and turn the key 59 180 degrees.

The function of the adjustment screw 112 is illustrated in FIG. 22 avoiding any rotation of the steering wheel lock through the cylindrical part of the steering wheel. In this version the bar 14 of the Universal Steering Wheel Lock will obstruct the rotation of the steering wheel 18 when the bar 14 starts to touch the front window of the car 102, the roof of the car, the glass of the drivers door 99 or the driver's door of the car 104, as illustrated in FIG. 23.

Figure 24:
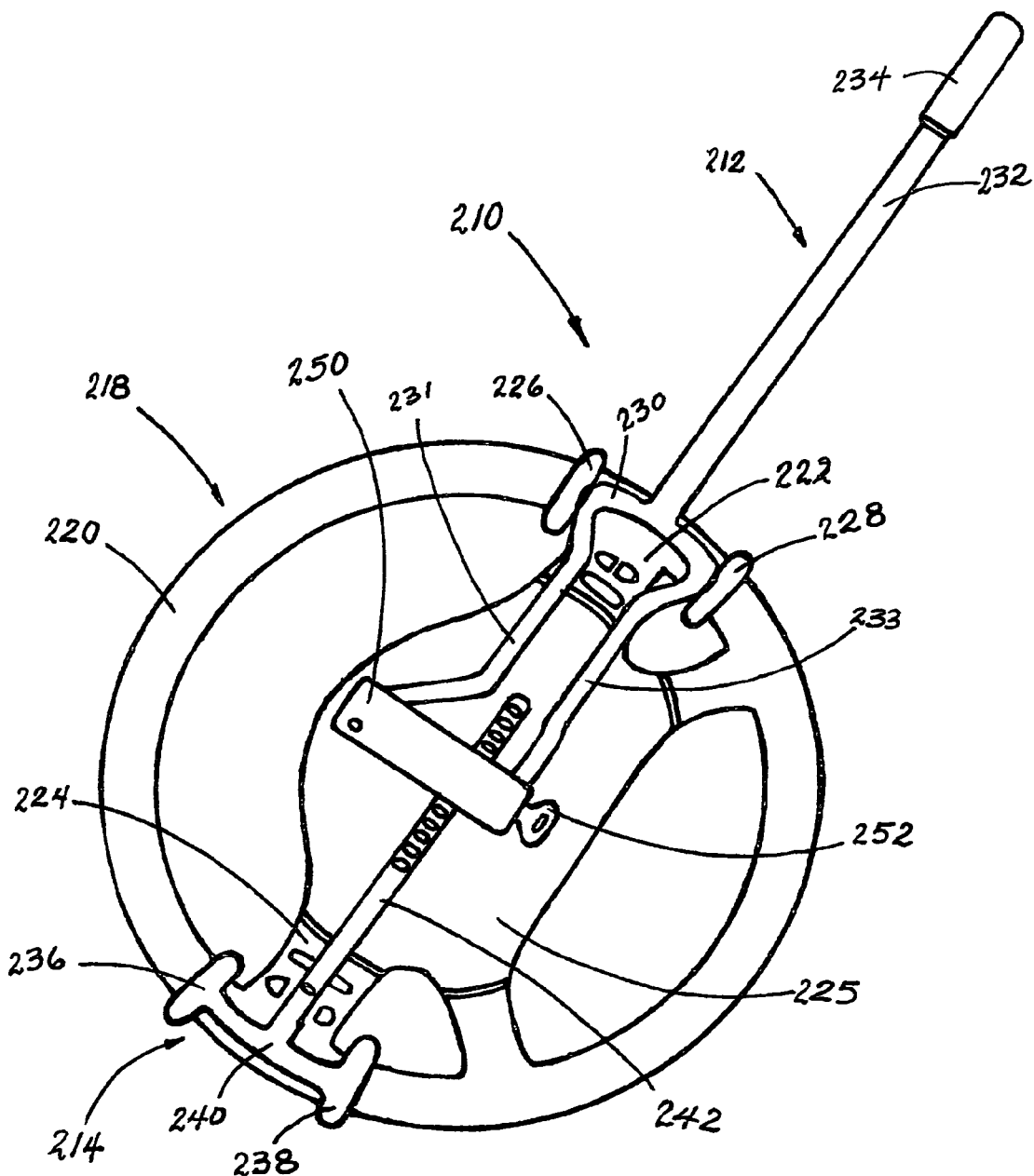
FIG. 24 is a view of a third, alternative embodiment of the lock of the present invention showing it attached to a steering wheel of a vehicle.
Figure 25:
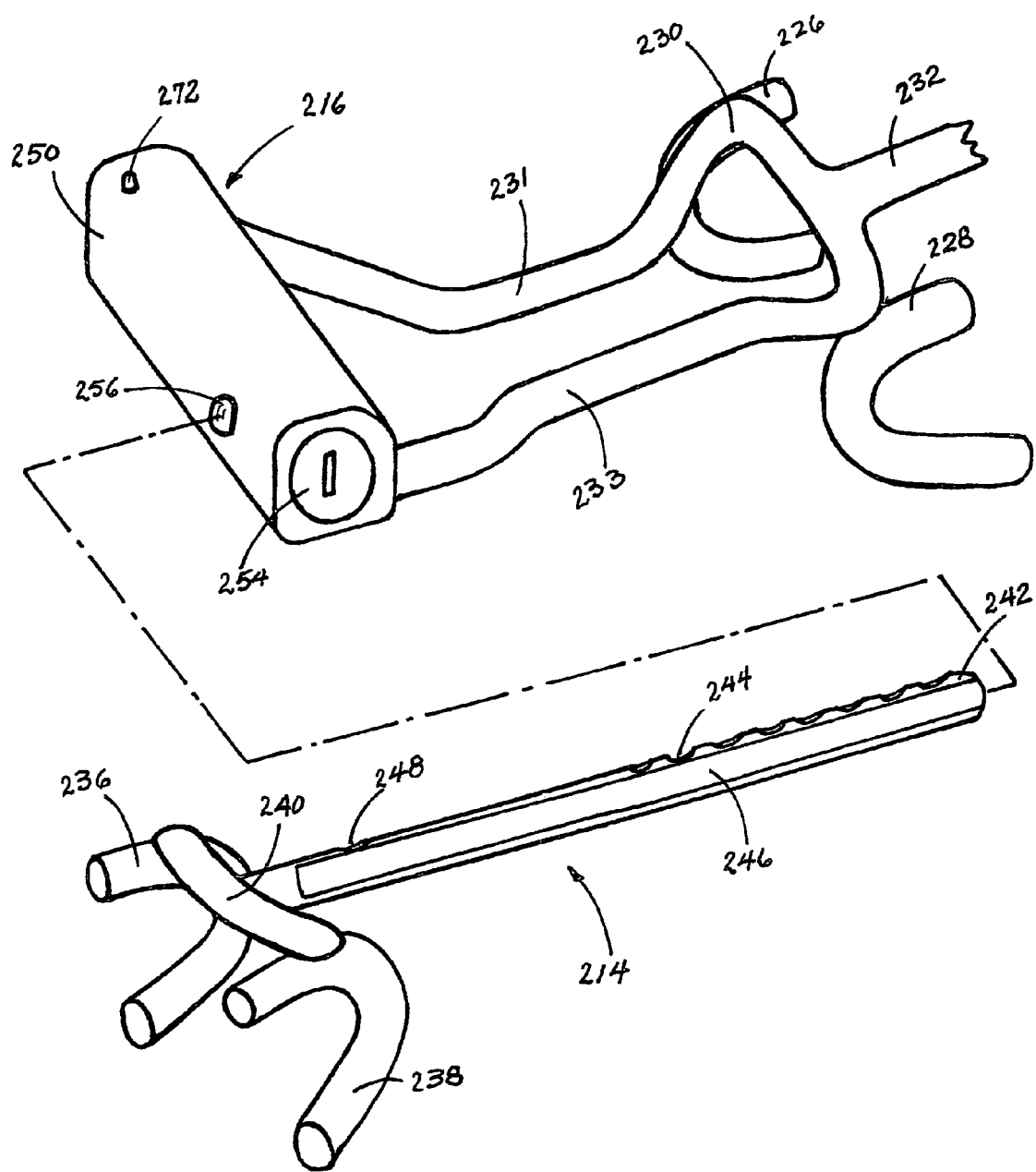
FIG. 25 is a view showing the special bar and lock of the third embodiment of the present invention.

Yet another embodiment of the Steering Wheel Lock of this invention is illustrated in FIG. 24 and designated generally by reference numeral 210. With reference now to the drawings and in particular to FIG. 24 and FIG. 25 the Steering Wheel Lock 210 is seen to comprise three basic components, namely: a major hook-bar unit 212, a minor hook-bar unit 214 and a lock 216. Each of these components will be discussed in detail below.

The Steering Wheel Lock 210 is used to lock the steering wheel 218 of a vehicle. The steering wheel 218 is formed by a cylindrical section 220 and at least a first arm 222 and a second arm 224 attached at the end to the cylindrical section 220 and to the center of the steering wheel 218 at the other end. The center of the steering wheel 218 has an airbag 225. The steering wheel lock 210 protects the airbag 225 from theft.

The major hook-bar unit 212 has first and second major U shape hooks 226. 228. The major U shape hooks 226, 228 are hooking up the upper and lower part of the cylindrical section of the steering wheel 220 next to the arm 222. Both major hooks 226, 228 attach to a major bended bar 230 at the beginning of the U shape of the major bended bar 230. The major bended bar 230 has first and second prolongation sections 231, 233 to protect the air bag 225. The prolongation sections 231, 233 of the major bended bar 230 run parallel in the middle of the length allowing the Steering Wheel Lock to be handle by a user. The ends of the major bended bar 230 attach to the lock 216 as illustrated in FIG. 25. At the opposite side of the major bended bar 230 is a major bar 232 to prevent turning of the steering wheel 218 when the presently claimed invention is attached to the steering wheel. The final sections of prolongations 231, 233 bend outward from each other to cover more area of the airbag 225.

The major bar 232 has at the end furthest from the lock 216 a grip 234. The grip 234 is typically made of soft rubber.

The minor hook-bar unit 214 has first and second minor U shape hooks 236, 238. The minor U shape hooks 236, 238, hook the upper and lower parts of the cylindrical section of the steering wheel 220 next to the arm 224. The minor hooks 236, 238 attach to a minor bended bar 240. At the middle of the minor bended bar 240 is the minor bar 242.

The minor bar 242 has at the top a sequtenlce of notches creating a sequence of ridges 244 used in the locking mechanism and a truncated area 246 in the right side of the minor bar 242 as illustrated in FIG. 25. The minor bar 242 has a single distal notch 248 used for storage position purposes.

The lock 216 is illustrated in FIG. 26, FIG. 27 and FIG. 28. The lock 216 has a semi square metal bar structure 250. The metal structure 250 has a key 252, a lock mechanism 254, a truncated hole 256, and a battery cavity 258 as illustrated in FIG. 26, FIG. 27 and FIG. 28. The truncated hole 256 has a spherical bearing 259 and an opening 260 as illustrated in FIG. 26 and FIG. 28. The trencated hole 256 allows passage of the minor bar 242.

The battery cavity 258 is designed to hold the batteries 262 and other components. The battery cavity 258 has a lid 264 able to slide wheii it is moved using a grip groove 266, allowing removing the batteries 262 from the battery cavity 258 as illustrated in FIG. 27 and FIG. 28.

Figure 29:
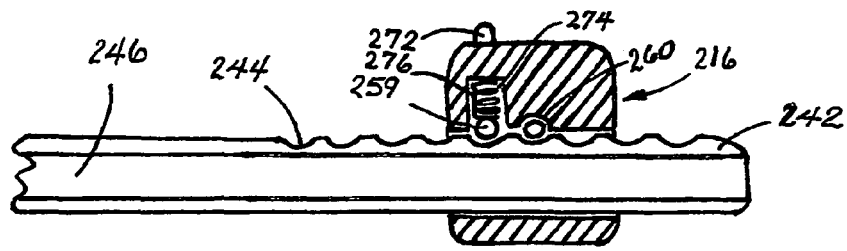
FIG. 29 is a cross-sectional view of the truncated bar engaging the lock of the third embodiment of the presently claimed invention.
Figure 30:
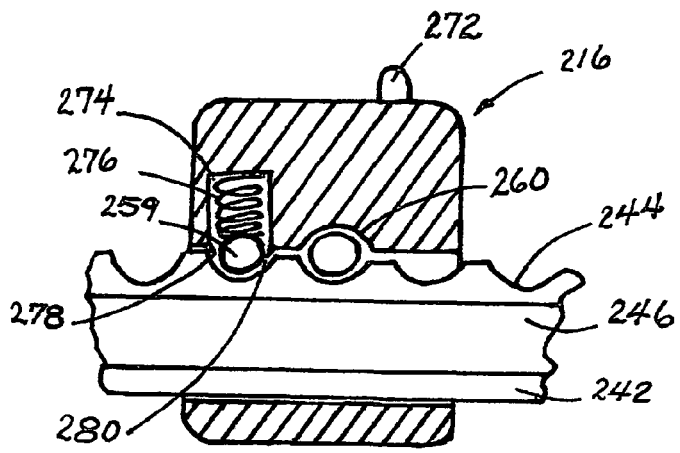
FIG. 30 is a cross-sectional, close-up view of the truncated bar engaging the lock of the third embodiment of the presently claimed invention.
Figure 31:
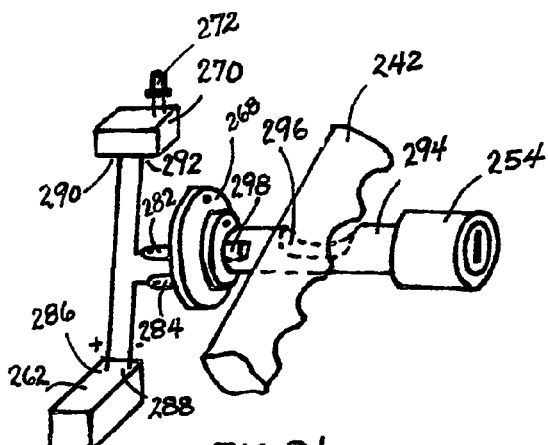
FIG. 31 is a view of an unlocked lock for the third embodiment of the presently claimed invention illustrating the wiring schematic for an LED warning system.
Figure 32:
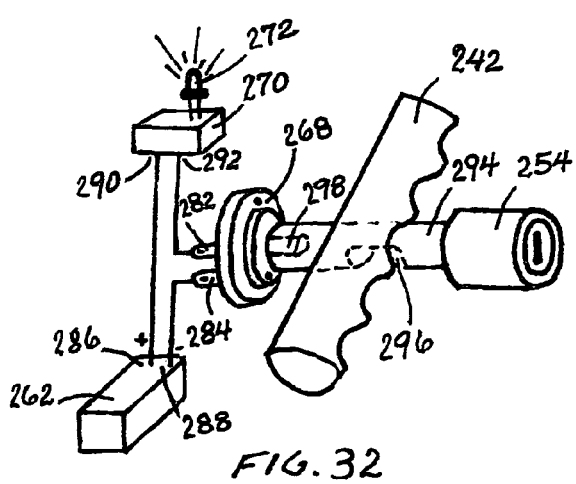
FIG. 32 is a view of a locked lock for the presently claimed invention illustrating the wiring schematic for an LED warning system.

Further the battery cavity 258 has a rotary switch 268, a switch circuit 270 and a LED 272, as illustrated in FIG. 31 and FIG. 32. The switch circuit 270 can be integrated inside the LED 272 creating a flashing LED. The inter-action between the minor bar 242 and the lock 216 is illustrated in FIG. 29 and FIG. 30. The minor bar 242 inserts into the lock 216 through the truncated hole 256.

The lock 216 has a spring cavity 274. The sprint cavity 274 accommodates the spring 276 and the spherical bearing 259. The spring cavity 274 has flanges 278, 280 to prevent the spherical bearing 259 from leaving the spring cavity 274.

The key lock mechanism 254 has a prolongation bar 294 as illustrated in FIG. 28, FIG. 31 and FIG. 32. The prolongation bar 294 has a prolongation bar recess 296. The opening 260 allows interaction with the prolongation bar 294 of the lock mechanism 254 with the ridges 244 of the minor bar 242.

The prolongation bar recess 296 allows the minor bar 242 to slide through the truncated hole 256 when the prolongation bar recess 296 is in the position illustrated in FIG. 31. In this case the minor bar 242 is unlocked.

The prolongation bar 294 has a rotary switch cavity 298 at the end with a half moon shape to insert the half moon bar of the rotary switch 268.

The rotary switch 268 has first and second switch contacts 282, 284 as illustrated in FIG. 31 and FIG. 32.

The switch contacts 282, 284 will be open in normal position and closed when the rotary switch 268 has rotated 180 degrees clockwise.

The batteries 262 have first and second battery contacts 286, 288. The first battery contact 286 is always connected to the switch circuit 270 via a first input 290. The second battery contact 288 of the battery 262 connects to the second switch contact 284 of the rotary switch 268. The first switch contact 282 of the rotary switch 268 connects to the second input 292 of the switch circuit 270.

When the minor bar 242 is unlocked, the first and second switch contacts 282, 284 of the rotary switch 268 are opened. In this situation no current flow from the batteries 262 to the switch circuit 270 and the LED 272 is off as illustrated in FIG. 31.

When the key 252 of the lock mechanism 254 turns 180 degrees the prolongation bar 294 is present between the ridges 244 of the minor bar 242 through the opening 260. The prolongation bar recess 296 is in the opposite side of the ridges 244 of the minor bar 242. In this case, the prolongation bar 294 of lock mechanism 254 locks the minor bar 242. At the same time when the key 252 turns 180 degrees clockwise the rotary switch 268 rotates 180 degrees too. closing the switch contacts 282,284 allowing to flux the current from the batteries 262 to the switch circuit 270 and the LED 272 starts flashing as illustrated in FIG. 32.

The prolongation bar 294 of the lock mechanism 254 is in the lock 216 a distance from the spherical bearing 259 exactly the distance between two ridges 244 of the special bar 242 as illustrated in FIG. 30. The spherical bearing 259 stops the minor bar 242 in a position allowing rotation of the key 252 of the lock mechanism 254.

Figure 33:
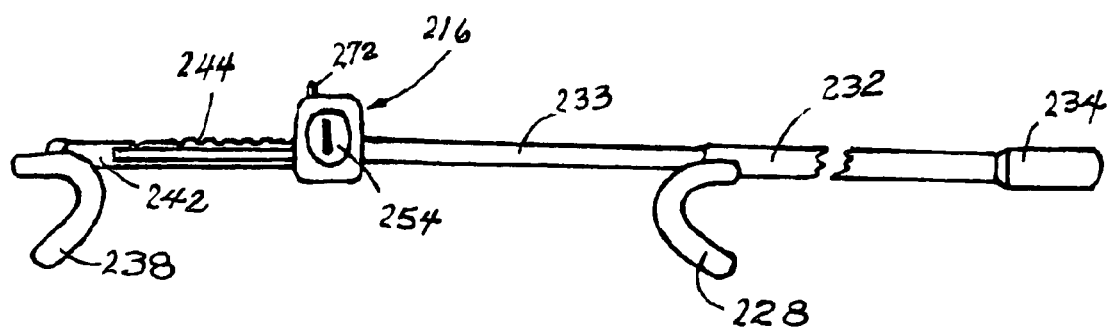
FIG. 33 is another view of the third, alternative embodiment of the lock of the present invention.

The Steering Wheel Lock in FIG. 33 shows the second major hook 228, and the second minor hook 238. The hooks 228, 238 lave an open U shape, thereby allowing them to wrap around different diameters of the cylindrical section 220 of the steering wheel 218. The hooks 226, 236 are generally the same shape. FIG. 33 also shows that all U shape hooks 226, 228, 236, and 238 might accommodate steering wheels of varied diameters. Further, the positioning of all U shape hooks 226, 228, 236, and 238 are inclined with respect to the horizontal line, allowing easier steering wheel lock installation.

The procedure for the adjustment of the steering wheel lock 210 to the steering wheel of a vehicle is described below.

Figure 34:
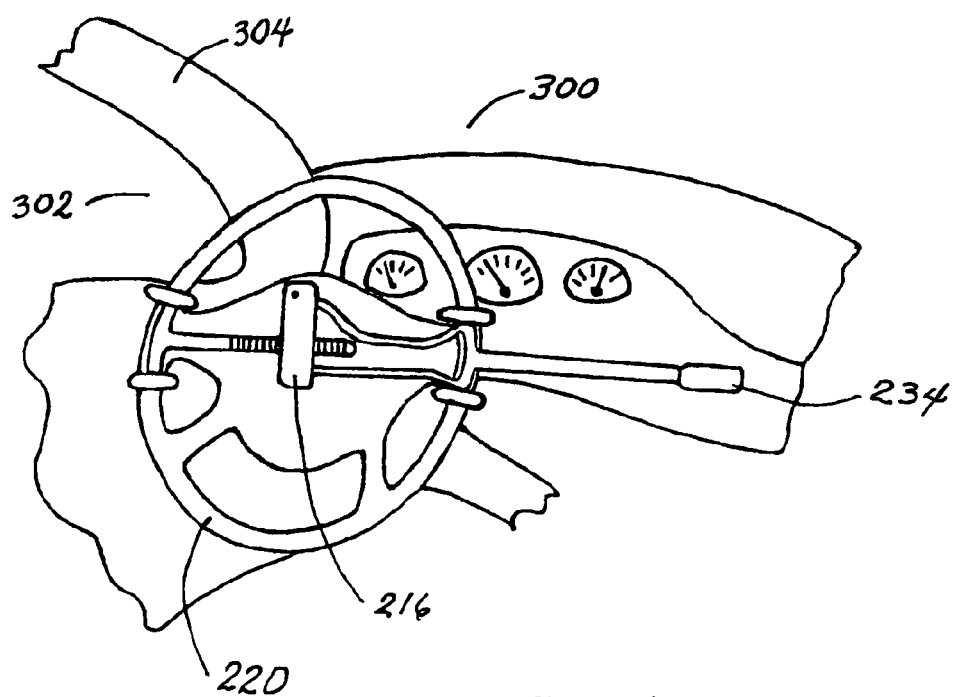
FIG. 34 is an environmental view of a third, alternative embodiment of the lock of the present invention installed in a motor vehicle.

The steering wheel lock 210 is inserted in the steering wheel 218 as illustrated in FIG. 24 and FIG. 34.

The minor hook-bar unit 214 is inserted in the lock 216 and moves in the opposite direction of the major hook-bar unit 212 until the steering wheel lock is tight.

The spherical bearing 259 in conjunction with the spring 276 allows the key 252 to be turned 180 degrees clockwise, thereby selecting the locking position.

In this position, the steering wheel lock has locked the steering wheel 218 of the vehicle and the LED 272 starts flashing.

In the locked position the lid 264 of the batteries 262 cannot be removed because once the steering wheel lock is placed oil the steering wheel, the lid abuts the steering wheel.

The major bar 232 of the steering wheel lock 210 firmly attaches to the cylindrical section 220 will obstruct the rotation of the steering wheel 218 when the major bar 232 starts to touch different sections of the vehicle like the front glass 300, the glass of the driver's door 302, the roof, the driver's door 304 and any other part of the structure of the vehicle making impossible to steal the vehicle as illustrated in FIG. 34.

The minor bar 242, the lock 216 and major U shape bar 230 with prolongation sections 231, 233 all of them attached will avoid stealing the airbag, too.

FIG. 34 illustrates the Steering Wheel Lock 210 installed in the steering wheel 218 of a vehicle.

The Universal Steering Wheel Lock is normally made of metal mainly hardened steel and covered some areas of finished chrome and colored rubber coating for preservation. Fluorescent paints can be used for better visualization and label logo of the product.

I claim:

1. A steering wheel lock comprising:
   a triple hook having,
      a bended bar attached between first and second U-shaped hooks, the first and second U-shaped hooks respectively have first and second ends following the arc shape of a vehicle steering wheel, whereby the bended bar abuts the horn at the center of the vehicle steering wheel, and the U-shaped hooks wrap around the wheel section of the steering wheel;
   a bar receiving mechanism attached to the triple hook,
      whereby the bar receiving mechanism is positioned approximately 70 degrees in reference with a side of the bended bar directly opposite the steering wheel to compensate the inclination of the steering wheel in a vehicle;
   the bar receiving mechanism including a lock box having,
      a bar cavity with an internal threaded orifice abutting the bar cavity along its longitudinal axis,
      a stopper cavity,
      a stopper knob cavity,
      a stopper having a stopper knob perpendicular at one end of the stopper, whereby the stopper and stopper knob have such size and dimension to substantially fill the stopper cavity and the stopper knob cavity;
   a bar fixable to the lock box, the bar having,
      at one end a screw shape with a thread to screw up in the bar cavity gradually until the desired position,
      at the other end of the bar a rubber grip, and a sequence of shallow ridges substantially along the length of the bar on one edge,
      a truncated area along a second side of the bar perpendicular and adjacent to the sequence of shallow ridges,
      first and second marks on the truncated area;
   a lock having,
      a lock housing,
      a truncated hole with a spherical bearing, whereby the bar slides through the truncated hole,
      an indicator recess with a rotary switch having first and second switch contacts whereby the switch contacts will be open in normal position and closed when the rotary switch has rotated 180 degrees clockwise, a switch circuit, an LED, a recess lid and a screw to secure the recess lid over the indicator recess,
      a key lock mechanism, with a prolongation bar having a prolongation bar recess, allowing the bar to slide through the truncated hole when the prolongation bar recess is unlocked, the prolongation bar has a rotary switch cavity at the end with a half moon shape to insert a half moon bar belonging to the rotary switch, the prolongation bar is a distance from the spherical bearing the distance between the sequence of shallow ridges;
      a case having batteries therein, a case lid with a groove secured over the case to hold the batteries, the batteries have first and second battery contacts, whereby the first contact is always connected to an input of the switch circuit, the second contact of the battery connects to the second switch contact of the rotary switch,
      a spring cavity with a spring and the spherical bearing, a set of flanges to avoid the exit of the spherical bearing from the spring cavity.

2. The steering wheel lock of claim 1, wherein the triple hook is hardened steel covered with a rubber finish to avoid any damage to the steering wheel.

3. The steering wheel lock of claim 1, wherein the lock has a curved impression to accommodate the circular wheel section of the steering wheel and a dimple to accommodate an arm of the steering wheel.

4. The steering wheel lock of claim 1, farther comprising: a truncated adjustment screw with a bended T head, wherein a threaded adjustment hole on the lock receives the truncated adjustment screw allowing a user to tighten or loosen the degree to which the adjustment screw protrudes from the lock and contacts an arm of the user's steering wheel, and a rectangular bar for fixing the truncated adjustment screw in a desired position.

5. A steering wheel lock comprising:
   a triple hook having,
      a bended bar attached between first and second U-shaped hooks, the first and second U-shaped hooks respectively have first and second ends following the arc shape of a vehicle steering wheel, whereby the bended bar abuts the horn at the center of the vehicle steering wheel, and the U-shaped hooks wrap around the wheel section of the steering wheel;
      a bar receiving mechanism attached to the triple hook, whereby the bar receiving mechanism is positioned approximately 70 degrees in reference with a side of the bended bar directly opposite the steering wheel to compensate the inclination of the steering wheel in a vehicle;
   the bar receiving mechanism including a lock box having, a bar cavity with an internal threaded orifice abutting the bar cavity along its longitudinal axis,
a stopper cavity
a stopper knob cavity,
a stopper having a stopper knob perpendicular at one end of the stopper,
whereby the stopper and stopper knob have such size and dimension to substantially fill the stopper cavity and the stopper knob cavity;
a bar fixable to the lock box at one end and at the other end of the bar a rubber grip,
a truncated area having a sequence of shallow ridges, along a longitudinal side, at one end a screw shape with a thread to screw up in the bar cavity gradually until the desired position,
first and second marks on the truncated area;
a lock having,
a lock housing,
a truncated hole with a spherical bearing, whereby the bar slides through the truncated hole,
an indicator recess with a rotary switch having first and second switch contacts whereby the switch contacts will be open in normal position and closed when the rotary switch has rotated 180 degrees clockwise, a switch circuit, an LED, a recess lid and a screw to secure the recess lid over the indicator recess,
a key lock mechanism, with a prolongation bar having a prolongation bar recess, allowing the bar to slide through the truncated hole when the prolongation bar recess is unlocked, the prolongation bar has a rotary switch cavity at the end with a half moon shape to insert a half moon bar belonging to the rotary switch, the prolongation bar is a distance from the spherical bearing the distance between the sequence of shallow ridges;
a case having batteries therein, a case lid with a groove secured over the case to hold the batteries, the batteries have first and second battery contacts, whereby the first contact is always connected to an input of the switch circuit, the second contact of the battery connects to the second switch contact of the rotary switch, a spring cavity with a spring and the spherical bearing, a set of flanges to avoid the exit of the spherical bearing from the spring cavity.

6. The steering wheel lock of claim 5, wherein the triple hook is hardened steel covered with a rubber finish to avoid any damage to the steering wheel.

7. The steering wheel lock of claim 5, wherein the lock has a curved impression to accommodate the circular wheel section of a steering wheel and a dimple to accommodate the arm.

8. The steering wheel lock of claim 5, further comprising: an adjustment screw with a bended T head, wherein a threaded adjustment hole on the lock receives the adjustment screw allowing a user to tighten or loosen the degree to which the adjustment screw protrudes from the lock and contacts an arm of the user's steering wheel and a rectangular bar for fixing the adjustment screw in a desired position.

9. A steering wheel lock comprising:
a major hook-bar unit having,
first and second major U shaped hooks attached to a major bended bar, the hooks follow the arc shape of a vehicle steering wheel, whereby the hooks wrap around the wheel section of the steering wheel;
a major bar attached to the center of the major bended bar between the major U shaped hooks, whereby when the major U shaped hooks are wrapped around the wheel section of the steering wheel the major bar extends away from the steering wheel,
first and second prolongation sections extending in the opposite direction of the major bar, at the corresponding first and second major U shaped hooks, whereby when the major U shaped hooks are wrapped around the wheel section of the steering wheel the prolongation sections cover the center of the steering wheel, including the driver's airbag, a minor hook-bar unit having,
first and second minor U shaped hooks attached to a minor bended bar, the hooks follow the arc shape of a vehicle steering wheel, whereby the hooks wrap around the wheel section of the steering wheel, wherein all the U shaped hooks are open U hook shape for accommodating different sized steering wheels and the U hooks so positioned so that they are inclined with respect to a horizontal line, thereby easing installation of the lock on the steering wheel,
a minor bar attached to the center of the minor bended bar between the minor U shaped hooks, the minor bar extending to the center of the steering wheel when the minor U shaped hooks are wrapped around the wheel section of the steering wheel, the minor bar having
a truncated area creating a flat surface on the generally round minor bar, the truncated area starting from the end of the minor bar distal to the minor bended bar and extending the majority of the length of the minor bar,
a sequence of ridges on the minor bar starting from the end of the minor bar distal to the minor bended bar and extending approximately half the length of the minor bar, whereby the ridges defined grooves, and
a distal notch on the same side as the sequence of ridges,
the distal notch on the minor bar proximal to the minor bended bar, and
a lock having,
a semi square metal bar structure attached to the first and second prolongation sections of the major hook-bar unit,
a lock mechanism in an end of the semi square metal bar structure, the lock mechanism receives a key,
a truncated hole, whereby the hole is shaped to receive the minor bar of the minor hook-bar unit,
a prolongation bar, whereby the prolongation bar, when the lock is locked prevents the minor bar from moving inside the truncated hole, and when the lock is unlocked allows the minor bar to slide freely inside the truncated hole,
a spring cavity defined inside the semi square metal bar structure perpendicular and adjacent to the truncated hole, the spring cavity having a spring in the bottom of the cavity pushing a bearing, the bearing prevented from leaving the spring cavity by flanges at the opening of the spring cavity, the bearing so shaped and positioned to fit within the ridges of the minor bar when the minor bar is placed in the truncated hole,
a LED, whereby the LED flashes when the lock is locked, and the LED is inactive when the lock is unlocked, the LED having first and second inputs,
a battery cavity for holding a battery, the battery cavity defined in an end of the semi square metal bar structure opposite the lock mechanism, the battery cavity further having first and second battery contacts, the first battery contact wired to the first input of the LED, a lid for securing the battery, the lid slideable over the battery, a grip groove defined in the lid, whereby a user can grasp the lid and slide it off of the battery cavity, thereby allowing replacement of batteries, and a rotary switch attached to the prolongation bar, the rotary switch having a switch circuit with first and second switch contacts, whereby when the lock is locked the switch contacts connect the second input and the second battery contact to illuminate the LED, and when the lock is unlocked the switch contacts disconnect the second input and the second battery contact to turn-off the LED.

10. The steering wheel lock of claim 9, further comprising a grip at the end of the major bar not attached to the minor bended bar.

11. The steering wheel lock of claim 10, wherein the grip is made of soft rubber.

* * * * *